US009340070B2

United States Patent
Takenaka (10) Patent No.: US 9,340,070 B2
(45) Date of Patent: May 17, 2016

(54) MOTORCYCLE TIRE

(71) Applicant: Sumitomo Rubber Industries, Ltd., Kobe-shi, Hyogo (JP)

(72) Inventor: Kouji Takenaka, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 362 days.

(21) Appl. No.: 13/756,853

(22) Filed: Feb. 1, 2013

(65) Prior Publication Data

US 2013/0199683 A1    Aug. 8, 2013

(30) Foreign Application Priority Data

Feb. 3, 2012    (JP) ................................. 2012-022225

(51) Int. Cl.
    *B60C 11/03*    (2006.01)
    *B60C 11/117*   (2006.01)

(52) U.S. Cl.
    CPC ........... *B60C 11/0302* (2013.04); *B60C 11/032* (2013.04); *B60C 2011/0372* (2013.04); *B60C 2011/0374* (2013.04); *B60C 2200/10* (2013.04)

(58) Field of Classification Search
    CPC ............ B60C 11/0311; B60C 11/0316; B60C 11/032; B60C 11/0323; B60C 11/1353; B60C 11/1369; B60C 2011/0313; B60C 2011/1361
    USPC ............. 152/209.11, 209.17, 209.18, 209.19, 152/209.22, 209.25; D12/500–608
    See application file for complete search history.

(56) References Cited

U.S. PATENT DOCUMENTS

| D347,609 | S | * | 6/1994 | Misani | D12/535 |
| 6,220,320 | B1 | * | 4/2001 | Nakagawa et al. | 152/209.11 |
| D612,322 | S | * | 3/2010 | Shibamoto | D12/535 |
| D625,682 | S | * | 10/2010 | Shibamoto | D12/535 |
| D644,596 | S | * | 9/2011 | Takenaka | D12/535 |
| D659,079 | S | * | 5/2012 | Takenaka | D12/535 |
| D674,737 | S | * | 1/2013 | Lamour | D12/535 |
| D687,368 | S | * | 8/2013 | Takenaka | D12/535 |
| 2005/0039835 | A1 | * | 2/2005 | Yamane | 152/209.11 |
| 2006/0130949 | A1 | * | 6/2006 | Nakamura | 152/209.11 |

(Continued)

FOREIGN PATENT DOCUMENTS

| EP | 368553 | A | * | 5/1990 | ............. B60C 11/04 |
| GB | 2114069 | A | * | 8/1983 | ............ B60C 11/032 |

(Continued)

*Primary Examiner* — Michael H Wilson
*Assistant Examiner* — Kendra Ly
(74) *Attorney, Agent, or Firm* — Birch, Stewart, Kolasch & Birch, LLP (57) ABSTRACT

A motorcycle tire includes a tread portion having a first region and a second region divided by the tire equator, with the tread portion being provided with first inner inclined grooves provided in the first region and second inner inclined grooves provided in the second region, first and second inner inclined grooves alternately arranged in a tire circumferential direction, the inner inclined groove extending from an axially inner end Ai toward an anti-designated rolling direction to an axially outer end Ao at an angle α of 0-20 to the tire circumferential direction, and first outer inclined grooves provided in the first region and second outer inclined grooves provided in the second region, and first and second outer inclined grooves alternately arranged in the tire circumferential direction, the outer inclined groove extending from an axially inner end Bi toward a designated rolling direction to an axially outer end Bo.

7 Claims, 5 Drawing Sheets

(56) References Cited

U.S. PATENT DOCUMENTS

2009/0078349 A1* 3/2009 Nakagawa ............... 152/209.11
2009/0308515 A1   12/2009 Matsunaga
2012/0285593 A1* 11/2012 Mariani et al. ............ 152/209.8

FOREIGN PATENT DOCUMENTS

| JP | 63121505 A | * | 5/1988 | |
| JP | 03135802 A | * | 6/1991 | B60C 11/04 |
| JP | 2009-298387 A | | 12/2009 | |

* cited by examiner

PRIOR ART

MOTORCYCLE TIRE

BACKGROUND OF THE INVENTION

1. Field of the Invention

The present invention relates to a motorcycle tire having an improved turning performance without deteriorating other performance.

2. Description of the Related Art

Figure 5:
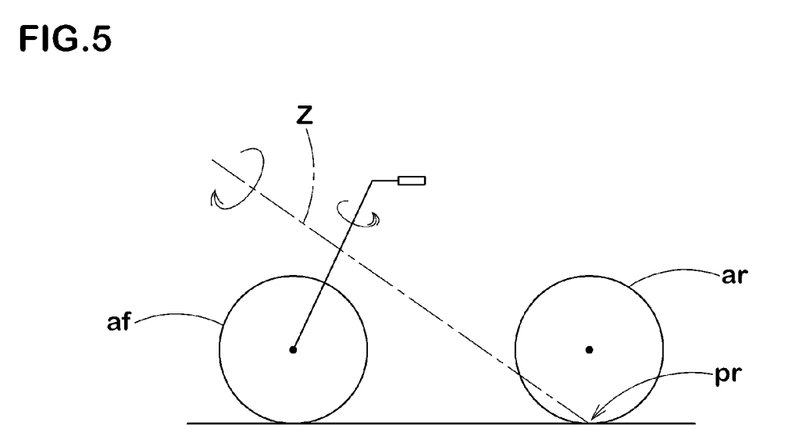
FIG. 5 is a side view of a simplified motorcycle.

Referring to FIG. 5, a typical motorcycle has a steerable front wheel (af) and a rear wheel (ar). In order for the motorcycle to turn, the motorcycle is banked toward the desired left or right turning direction with respect to a roll axis z while giving the front wheel (af) a small steering angle according to the degree of the bank. In a certain moment of the turning, the typical roll axis z is an axis that extends from a ground contact point (pr) of the rear wheel (ar) toward the upward and the forward direction.

In order to improve the turning performance of the motorcycle, the motorcycle tire is requested to be easily banked by a driver during the beginning of the turning. On the other hand, when the final stage of turning that the motorcycle is banked at about the maximum bank angle, it is also requested that the tire generates a resistance force for preventing a further banked and holding the full banked state. Namely, the motorcycle tire is requested to have a property including easy rolled or banked performance at the beginning of turning and resistance performance for preventing further roll at the full banked state.

Figure 6:
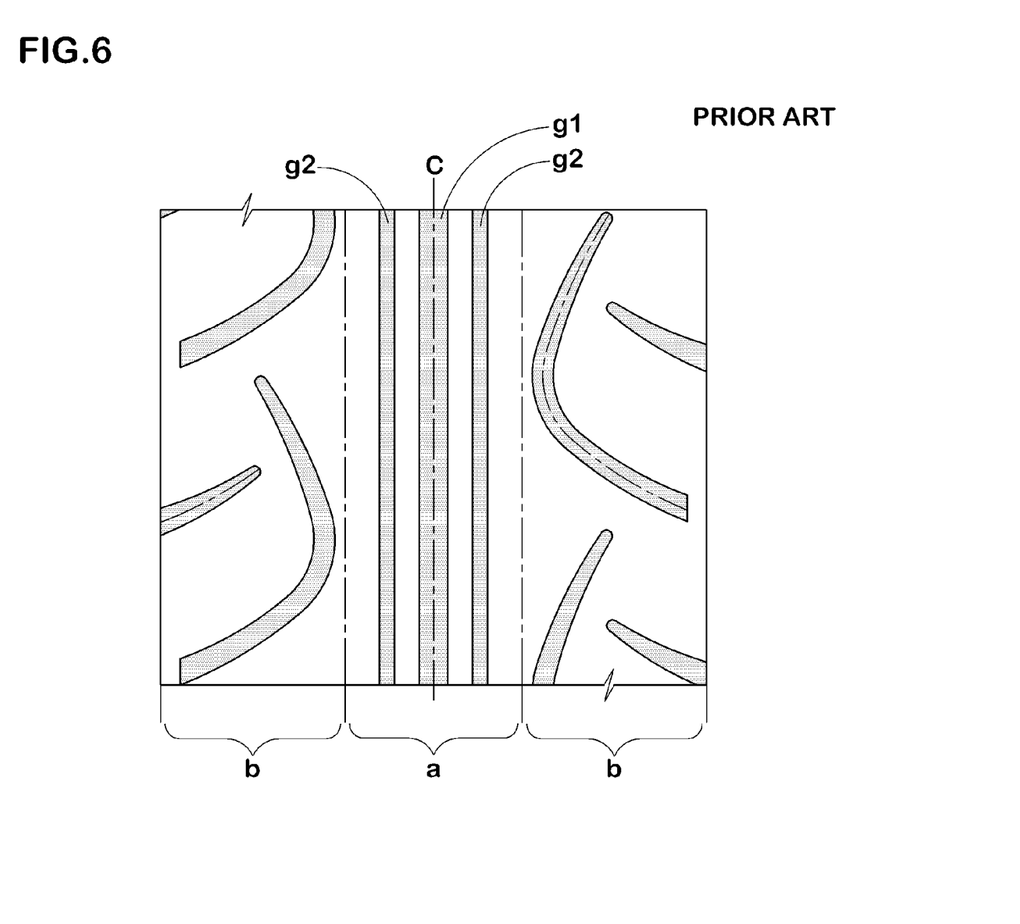
FIG. 6 is a development view of a tread portion of a conventional motorcycle tire.

Referring to FIG. 6, JP-2009-298387A1 discloses a motorcycle tire having a tread portion including: a center region (a) which comes into contact with the ground when the tire travels in straight; and a pair of shoulder regions (b) which come into contact with the ground during turning. The center region (a) is provided with a circumferentially extending center main groove g1 on the tire equator C, and a pair of circumferentially extending middle grooves g2 provided axially both sides of the center main groove g1, and is not provided with any inclined grooves.

However, the tire described above has unsatisfactory turning performance.

SUMMARY OF THE INVENTION

The present invention has been worked out in light of the circumstances described above, and has a main object of providing a motorcycle tire having an improved turning performance without deteriorating other performance. In accordance with the present invention, there is provided a motorcycle tire comprising a tread portion having a designated rolling direction, the tread portion having a tread surface between a pair of tread edges while curving in a convex arc-like manner and having a tread width which is an axial distance between the tread edges being a maximum tire width, and the tread portion including a first region between a tire equator and one of said tread edges and a second region between the tire equator and the other one of said tread edge, the tread surface being provided with a plurality of inner inclined grooves and a plurality of outer inclined grooves, said inner inclined grooves comprising a plurality of first inner inclined grooves provided in the first region and a plurality of second inner inclined grooves provided in the second region, said first inner inclined grooves and said second inner inclined grooves being alternately arranged in a circumferential direction of the tire, in each first and second regions, said each inner inclined grooves extending from an axially inner end Ai toward an anti-designated rolling direction to an axially outer end Ao at an angle α in a range of from 0 to 20 degrees with respect to the circumferential direction of the tire, and the axially inner end Ai located in an axial distance of from 0 to 5% a half tread developed-width from the tire equator, said outer inclined grooves comprising a plurality of first outer inclined grooves provided in the first region and a plurality of second outer inclined grooves provided in the second region, said first outer inclined grooves and said second outer inclined grooves being alternately arranged in the circumferential direction of the tire, in each first and second regions, each outer inclined grooves extending from an axially inner end Bi toward the designated rolling direction to an axially outer end Bo, the axially inner end Bi located axially inside than the axially outer end of the inner inclined groove, and the axially outer end Bo located in a distance of from 80 to 95% the half tread developed-width from the tire equator, each outer inclined groove having an angle βi at the axially inner end Bi of from 150 to 170 degrees with respect to the circumferential direction of the tire, and each outer inclined groove having an angle βo at the axially outer end Bo of from 110 to 130 degrees with respect to the circumferential direction of the tire.

In this application the half tread developed-width means a length from the tire equator to one of the tread edges measured along the tread surface.

DETAILED DESCRIPTION

An embodiment of the present invention will be explained below with reference to the accompanying drawings.

Figure 1:
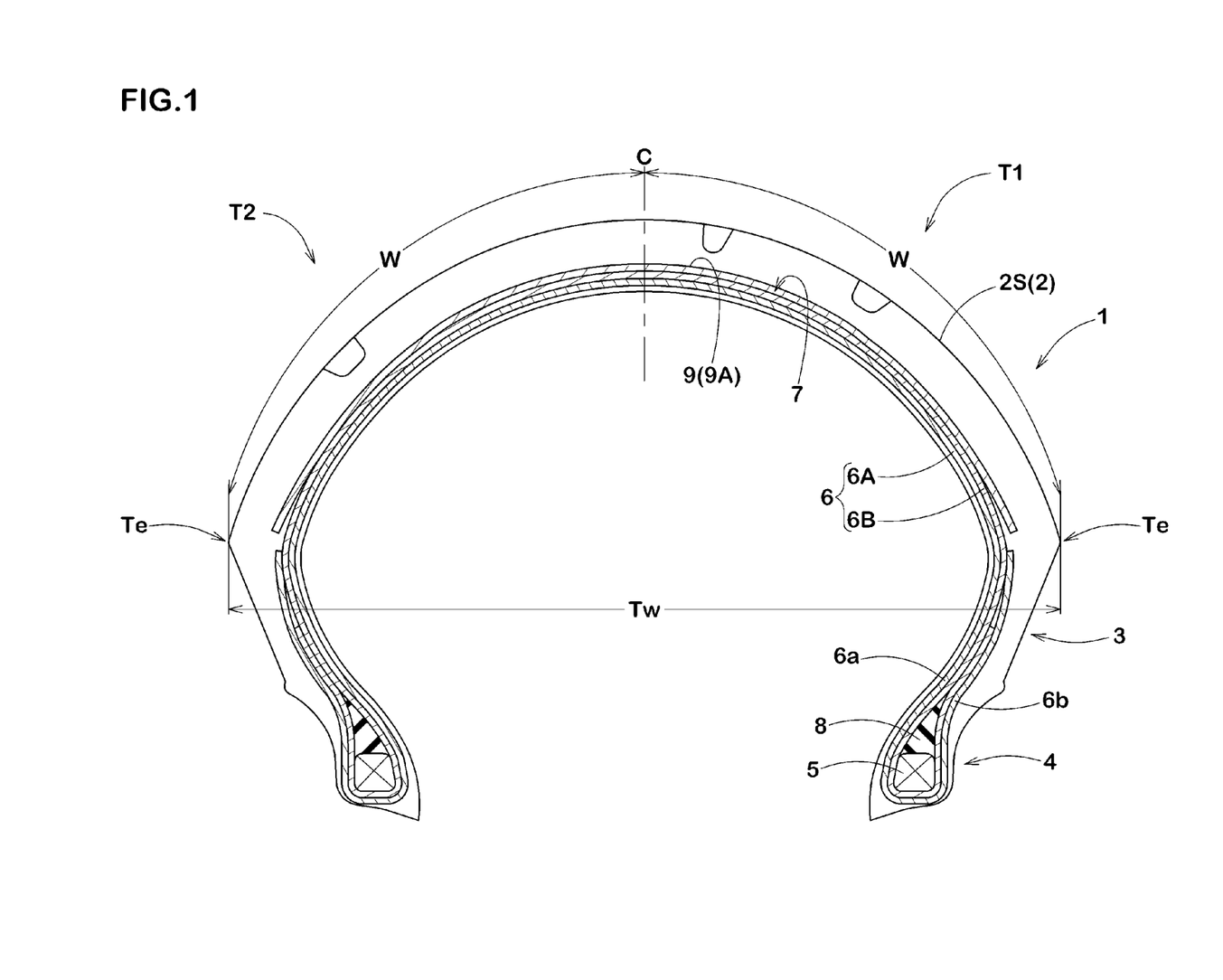
FIG. 1 is a cross sectional view of a motorcycle tire showing an embodiment of the present invention.

Referring to FIG. 1, a motorcycle tire 1 in accordance with the present invention comprises a tread portion 2 having a tread surface 2S which comes into contact with the ground, a pair of sidewall portions 3 extending from axially both ends of the tread portion 2, and a pair of bead portion 4 each with a bead core 5 therein.

In order for a motorcycle to have a large bank angle during turning, the tread surface 2S has a profile extending between a pair of tread edges Te while curving in a convex arc-like manner and having a tread width Tw which is an axial distance between the tread edges Te being a maximum tire width. Moreover, the tread portion 2 includes a first region T1 between a tire equator c and one of the tread edges Te and a second region T2 between the tire equator C and the other one of the tread edge Te.

The motorcycle tire 1 comprises a carcass 6 extending between bead cores 5 through the tread portion 2 and sidewall portions 3 and a tread reinforcing layer 7 disposed radially outside the carcass 6 in the tread portion 2.

The carcass 6 includes at least one carcass ply of cords inclined at an angle of from 60 to 90 degrees with respect to the tire equator C, and two carcass plies 6A and 6B in this embodiment are provided. Each carcass ply 6A and 6B comprises a main portion 6A extending between bead cores 5 and a pair of turn-up portions 6b each turned up around the bead core 5 from the axially inside to the outside of the tire. A bead apex rubber 8 is provided in between the main portion 6a and the turned up portion 6b which extends and tapers radially outwardly from the bead core 5. As the carcass 6, bias carcass plies that include carcass cords inclined at angle of from 20 to 60 degrees with respect to the tire equator C may be employed.

The tread reinforcing layer 7 includes a band layer 9 comprising at least one band ply 9A of cords spirally wound along in the circumferential direction of the tire. A belt layer having a belt ply of cords inclined at angle of from 10 to 70 degrees with respect to the circumferential direction of the tire may be employed instead of the band layer 9. Moreover, the belt layer may be provided in between the carcass 6 and the band layer 9.

Figure 2:
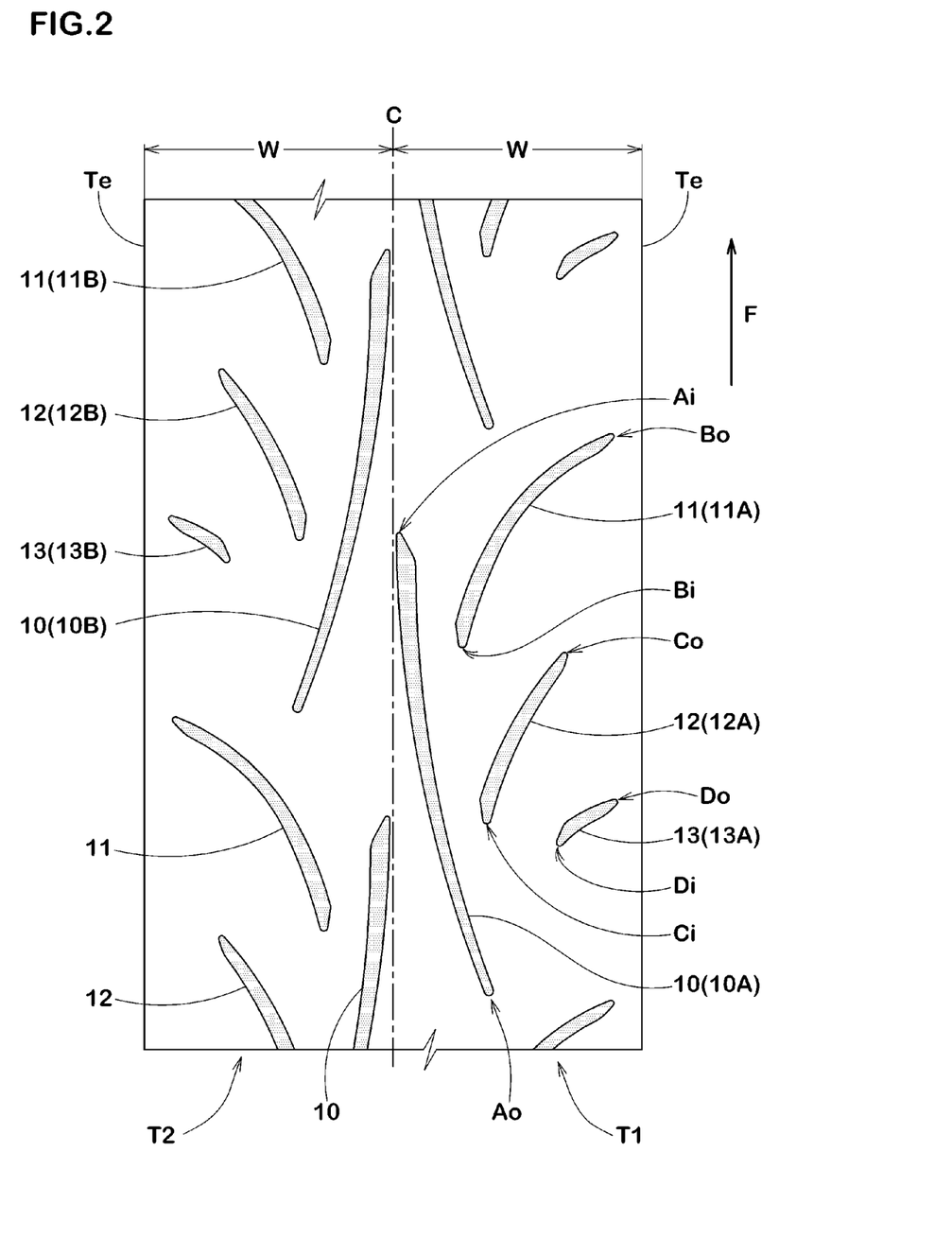
FIG. 2 is a development view of a tread portion of the motorcycle tire of FIG. 1.

Referring to FIG. 2, the tread portion 2 has a designated rolling direction F. The tread surface 2S is provided with a plurality of inner inclined grooves 10 and a plurality of outer inclined grooves 11.

Figure 3:
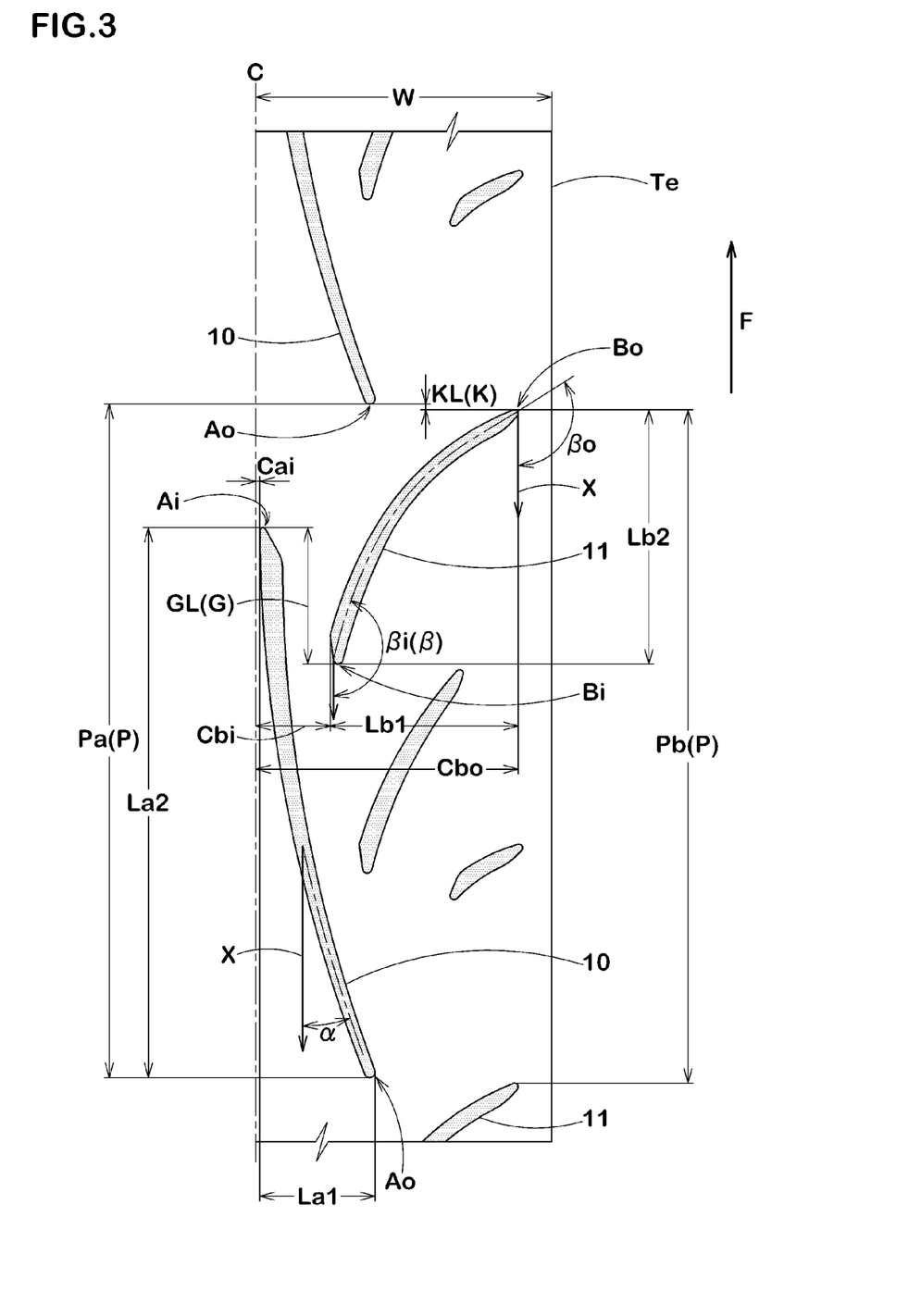
FIGS. 3 and 4 are partial enlarged views of FIG. 2.

The inner inclined grooves 10 comprising a plurality of first inner inclined grooves 10A provided in the first region T1 with circumferential pitches Pa and a plurality of second inner inclined grooves 10B provided in the second region T2 with the pitches Pa (shown in FIG. 3). The first inner inclined grooves 10A and the second inner inclined grooves 10B are alternately arranged in the circumferential direction of the tire on both side of the tire equator C.

Referring to FIGS. 2 and 3, in each of the first and second regions T1 and T2, each inner inclined groove 10 extends from an axially inner end Ai toward an anti-designated rolling direction to an axially outer end AO at an angle α in a range of from 0 to 20 degrees with respect to the circumferential direction of the tire (a circumferential line x which extends toward the anti-designated rolling direction from the groove). In this embodiment, the angle α is gradually increasing toward the axially outer end Ao from the axially inner end Ai. The angle α may be a constant so that the inner inclined groove 10 extends in a straight manner.

The axially inner end Ai of the inner inclined groove 10 is located in an axial distance Cai of from 0 to 5% a half tread developed-width w from the tire equator C.

The axial distance La1 between the axially inner and Ai and the axially outer end Ao of the inner inclined groove 10 is in a range of from 20 to 50% the half tread developed-width w. The circumferential length La1 between the axially inner and Ai and the axially outer end Ao of the inner inclined groove 10 is in a range of from 70 to 85% the pitches Pa.

The outer inclined grooves 11 comprises a plurality of first outer inclined grooves 11A provided in the first region T1 with circumferential pitches Pb and a plurality of second outer inclined grooves 11B provided in the second region T2 with the pitches Pb. The first outer inclined grooves 11A and the second outer inclined grooves 11B are alternately arranged in the circumferential direction of the tire at both sides of the tire equator C.

In each first and second region T1 and T2, each outer inclined groove 11 extends from an axially inner end Bi toward the designated rolling direction F to an axially outer end Bo. Namely, the outer inclined grooves 11 are inclined opposite direction to the inner inclined groove 10. In this embodiment, each outer inclined groove 11 has an angle β with respect to the circumferential line x which is gradually decreasing from the axially inner end Bi to the axially outer end Bo. The angle βi at the axially inner end Bi is in a range of from 150 to 170 degrees with respect to the circumferential line x, and the angle βo at the axially outer end Bo is in a range of from 110 to 130 degrees.

The axially inner end Bi of the outer inclined groove 11 is located axially inside than the axially outer end Ao of the inner inclined groove 10, and the axially outer end Bo is located in the distance Cbo of from 80 to 95% the half tread developed-width w from the tire equator C.

Preferably, the axial distance Cbi between the tire equator C and the axially inner end Bi of the outer inclined groove 11 is in a range of from 20 to 30% the tread developed-width w. Preferably, the axial distance Lb1 from the axially inner end Bi to the axially outer end Bo of the outer inclined groove 11 is in a range of from 50 to 80% the tread developed-width W. Preferably, the circumferential length Lb2 from the axially inner end Bi to the axially outer end Bo of the outer inclined groove 11 is in a range of from 30 to 45% the pitches Pb. In this embodiment, the pitch Pa and the pitch Pb are the same, and hereinafter these pitches Pa and Pb may be simply referred pitches P.

In this embodiment, the inner inclined groove 10 and the outer inclined groove 11 are partially overlapped each other in the circumferential direction of the tire in each first and second regions T1 and T2. Moreover, the inner inclined groove 10 and the outer inclined groove 11 are separated in a distance KL less than 5 mm in the circumferential direction of the tire. Namely, the outer inclined groove 11 extends so as to substantially bridge in between adjacent inner inclined grooves 10, 10 in the circumferential direction of the tire. In this embodiment, axially inner portion of the inner inclined groove 10 and the axially inner portion of the outer inclined groove 11 are overlapped each other in the circumferential direction of the tire so as to have an overlapped portion G. Moreover, the axially outer portion of the inner inclined groove 10 and the axially outer portion of the outer inclined groove 11 are separated in the distance KL less than 5 mm in the circumferential direction of the tire so as to form a close portion K.

Since the inner inclined grooves 10 and the outer inclined grooves 11 are arranged in a manner described above, the tire 1 may be smoothly rotate. Moreover, since the axially inner end Bi of the outer inclined groove 11 is located axially inside than the axially outside the axially outer end Ao of the inner inclined groove 10 so as to have an overlapped portion in the tire axial direction, the tire 1 is smoothly banked from the straight running state until a full banked state by the driver, and thereby the transient performance from the straight running state to a banked state is improved. Here, if the distance KL of the close portion K is not less than 5 mm, the tire 1 is difficult to smoothly rotate. Moreover, the circumferential length GL of the overlapped portion G is preferably not more than 40 mm in order to prevent the decrease of the rigidity of the tread portion 2.

Moreover, since the motorcycle tire 1 has inner inclined grooves 10 each having a small angle α of from 0 to 20 degrees with respect to the circumferential line x, the pattern rigidity of a tread center portion that comes into contact with the ground in straight running may be maintained higher. Therefore, the tire 1 has an improved stability in straight running as well as wear resistance thereof. Moreover, since the tread surface 2S is easy to deform due to the inner inclined groove 10, it may absorb the impact from the ground. Here, if the angle α is more than 20 degrees, the pattern rigidity of the tread portion 2 tends to decrease, and thereby the effects above may not be sufficiently obtained. Moreover, if the distance Cai is more than 5% the half tread developed-width w, the wet performance in straight running tends to deteriorates.

Since each inner inclined groove 10 has an angle of not more than 20 degrees, the tire 1 is easy to be banked from the straight running during the beginning of the turning. Basically, a force that steers the front wheel of the motorcycle is generated at right angle with respect to grooves in the ground contact region of the front tire of the motorcycle. Namely, when angles of grooves with respect to the traveling direction of the motorcycle tend to be the right angles, the greater force may be generated. Therefore, since such inner inclined grooves 10 generate less force that steers the front wheel, the tire 1 is easy to be banked.

On the other hand, the outer inclined grooves 11 are inclined the opposite direction to the inner inclined grooves 10, and have angles $\beta i$ at the axially inner ends of from 150 to 170 degrees with respect to the circumferential line x and angles $\beta o$ at the axially outer ends of from 110 to 130 degrees. Namely, the outer inclined grooves 11 tend to be right angles with respect to the traveling direction when the tire 1 is approaching the full banked state, and thereby the force that tries to steer the wheel is gradually increased. Therefore, the tire 1 may generate the resistance force for preventing further roll and holding the full banked state. During turning, the difference between the traveling direction of the motorcycle and the traveling direction of the tire is generated due to the steering angle thereof. In order to generate the force that tends to steer the tire, the angle $\beta$ of the outer inclined groove 11 is not less than 90 degrees.

Moreover, if the axial distance Cbo is less than 80% the half tread developed-width w, the wet performance in turning is unsatisfactory. If the distance Cbo is more than 95%, the rigidity of the tread shoulder region is liable to lower, and thereby the stability in the full banked state on the dry road is decreased.

If the angle $\beta i$ is outside the range of from 150 to 170 degrees, the tire 1 may be difficult to bank during turning. If the angle $\beta o$ is more than 130 degrees, the resistance force for preventing the further roll is not sufficiently obtained. If the angle $\beta o$ is less than 110 degrees, the turning performance is liable to decrease. Preferably, the difference between the angle $\beta i$ and the angle $\beta o$ is in a range of from 30 to 50 degrees.

In this embodiment, the tread surface 2S is provided with a plurality of middle inclined grooves 12 and a plurality of outer inclined sub-grooves 13 in each first and second regions T1 and T2.

Figure 4:
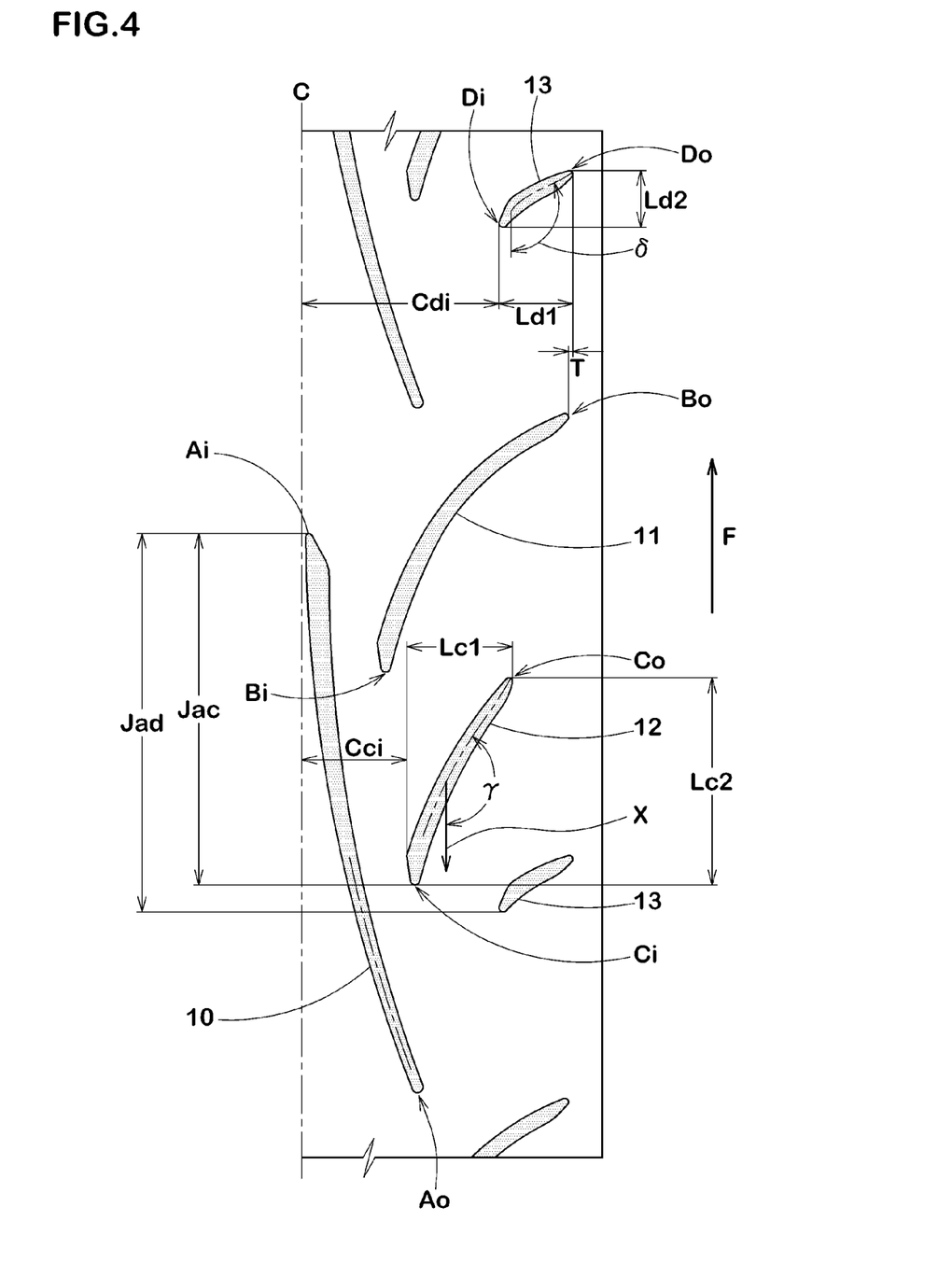

Referring to FIG. 4, in each first and second region T1 and T2, each middle inclined groove 12 extends from an axially inner end Ci to an axially outer end Co having the same inclination direction with the outer inclined groove 11. The middle inclined groove 12 has an angle $\gamma$ in a range of from 140 to 175 degrees with respect to the circumferential line x, and the angle $\gamma$ is gradually decreasing toward the axially outer end Co.

The axially inner end Ci of the middle inclined groove 12 is located in between the axially inner end Bi of the outer inclined groove 11 and the axially outer end Ao of the inner inclined groove 10. The axially outer end co of the middle inclined groove 12 is located in between the axially outer end Ao of the inner inclined groove 10 and the axially outer end Bo of the outer inclined groove 11.

The axial distance Cci between the tire equator C and the axially inner end Ci of the middle inclined groove 12 is in a range of from 20 to 50% the half tread developed-width w. The circumferential length Lc2 between the axially inner end Ci and the axially outer end Co of the middle inclined groove 12 is in a range of from 25 to 40% the pitch P. Moreover, the circumferential length Jac from the axially inner end Ai of the inner inclined groove 10 to the axially inner end Ci of the middle inclined groove 12 is in a range of from 40 to 60% the pitch P.

In each first and second region T1 and T2, each outer inclined sub-groove 13 extends from an axially inner end Di to an axially outer end Do having the same inclination direction with the outer inclined groove 11. In this embodiment, the outer inclined sub-groove 13 has an angle $\delta$ of from 110 to 130 degrees with respect to the circumferential line x, and the angle $\delta$ is gradually decreasing toward the axially outer end Do thereof.

The axially inner end Di of the outer inclined sub-groove 13 is located in between the axially outer end Ao of the inner inclined groove 10 and the axially outer end co of the middle inclined groove 12. The axially outer end (Do) of the outer inclined sub-groove 13 is located substantially the same axial position of the axially outer end Bo of the outer inclined groove 11. preferably, the axial distance T between the axially outer end Bo and the axially outer end (Do) is not more than 5 mm.

Preferably, the axial distance Cdi of the axially inner end Di of the outer inclined sub-groove 13 from the tire equator C is in a range of from 50 to 80% the half tread developed-width w. Preferably, the axial distance Ld1 between the axially inner end Di and the axially outer end (Do) of the outer inclined sub-groove 13 is in a range of from 10 to 40% the half tread developed-width W. Preferably, the circumferential distance Ld2 between the axially inner end Di and the axially outer end (Do) of the outer inclined sub-groove 13 is in a range of from 5 to 10% the pitch P. Preferably, the circumferential length Jad from the axially inner end Ai of the inner inclined groove 10 to the axially inner end Di of the outer inclined sub-groove 13 is in a range of from 45 to 65% the pitch P.

The middle inclined groove 12 and the outer inclined sub-groove 13 gradually increase the force that tries to steer the tire of the motorcycle until the full banked state, during turning, and thereby it is prevented that the tire is banked as an excessive angle. Preferably, the outer inclined groove 11, the middle inclined groove 12 and outer inclined sub-groove 13 are satisfied the following relations:

Lb1>Lc1>Ld1, and

Lb2>Lc2>Ld2.

Each of the inner inclined grooves 10, the outer inclined groove 11, the middle inclined groove 12 and the outer inclined sub-groove 13 has a groove width being gradually decreasing from each axially inner end to the axially outer end. Groove widths and depths of the inner inclined groove 10, the outer inclined groove 11, the middle inclined groove 12 and the outer inclined sub-groove 13 are not particularly limited, typical groove width and depth for motorcycle tires are preferably employed.

The present invention is more specifically described and explained by means of the following Examples and References. It is to be understood that the present invention is not limited to these Examples.

Comparison Test

Motorcycle tires having basic tread patterns of FIG. 2 and the same internal structure of FIG. 1 except for details shown in Table 1 were manufactured. Then, these tires were tested with respect to shock absorbing, turning performance, and grip performance. Major common specifics of tires and test method are as follows.

Tire size: 120/70zR17
Half tread developed-width w: 80 mm
Pitch P: 185 mm

In the table 1, each reference *1, *2 and *3 means the following definition:

*1: a ratio (%) is shown with respect to the half tread developed-width w;

*2: "+F" means that the groove extends toward the designated rolling direction from axially inside to the outside of the tire and "−F" means that the groove extends toward the anti-designated rolling direction from axially inside to the outside of the tire; and

*3: a ratio (%) is shown with respect to the pitch P.

Shock Absorbing Test:

Each test tire was mounted on a rim of MT3.50×17 with an internal pressure of 250 kPa, and then it was installed in the front wheel of a motorcycle having a four cycle engine of 750 cc displacement. As for the rear wheel of the motorcycle, a conventional tire of 180/55zR17 was installed using a rim of MT5.50×17 with an internal pressure of 290 kPa. A test driver drove the motorcycle on a test course having a dry asphalt road, and evaluated the shock absorbing performance by his feeling. The result is shown as a score. The greater the score, the better the performance is.

Turning Performance Test:

A test driver drove the motorcycle described above on the test course and evaluated the turning performance such as controllability of beginning in turning, controllability at full banked state and the transient characteristic therebetween by his feeling. The result is shown as a score. The greater the score, the better the performance is.

Grip Performance Test:

A test driver drove the motorcycle described above on the test course and evaluated the grip performance by his feeling. The result is shown as a score. The greater the score, the better the performance is.

Test results are shown in Table 1

TABLE 1

|  | Ref. 1 | Ex. 1 | Ex. 2 | Ex. 3 | Ex. 4 | Ref. 2 | Ex. 5 | Ref. 3 | Ref. 4 | Ref. 5 | Ex. 6 | Ex. 7 |
|---|---|---|---|---|---|---|---|---|---|---|---|---|
| Inner inclined groove |  |  |  |  |  | Presence |  |  |  |  |  |  |
| Distance Cai (%) *1 | −3 | 0 | 1 | 3 | 5 | 7 | 3 | 3 | 3 | 3 | 3 | 3 |
| Inclination direction *2 |  |  |  |  |  | −F |  |  |  |  |  |  |
| Angle α (deg.) | 0-15 | 0-15 | 0-15 | 0-15 | 0-15 | 0-15 | 0-20 | 0-30 | 0-15 | 0-15 | 0-15 | 0-15 |
| Axial distance La1 (%) *1 | 38 | 38 | 38 | 38 | 38 | 38 | 50 | 70 | 38 | 38 | 38 | 38 |
| Length La2 (%) *3 |  |  |  |  |  | 81 |  |  |  |  |  |  |
| Arrangement of first and second inner inclined groove |  |  |  | Alternate (FIG. 2) |  |  |  |  | Symmetric | Alternate (FIG. 2) | | |
| Outer inclined groove |  |  |  |  |  | Presence |  |  |  |  |  |  |
| Distance Cbi (%) *1 |  |  |  |  |  | 25 |  |  |  |  |  |  |
| Axial distance Cbo (%) *1 | 88 | 88 | 88 | 88 | 88 | 88 | 88 | 88 | 88 | 75 | 80 | 95 |
| Inclination direction *2 |  |  |  |  |  | +F |  |  |  |  |  |  |
| Angle βi at inner end (deg.) |  |  |  |  |  | 155 |  |  |  |  |  |  |
| Angle βo at outer end (deg.) |  |  |  |  |  | 125 |  |  |  |  |  |  |
| Axial distance Lb1 (%) *1 | 63 | 63 | 63 | 63 | 63 | 63 | 63 | 63 | 63 | 50 | 55 | 70 |
| Length Lb2 (%) *3 | 38 | 38 | 38 | 38 | 38 | 38 | 38 | 38 | 38 | 30 | 33 | 42 |
| Arrangement of first and second outer inclined groove |  |  |  | Alternate (FIG. 2) |  |  |  |  | Symmetric | Alternate (FIG. 2) | | |
| Middle inclined groove |  |  |  |  |  | Presence |  |  |  |  |  |  |
| Distance Cci (%) *1 |  |  |  |  |  | 37 |  |  |  |  |  |  |
| Inclination direction *2 |  |  |  |  |  | +F |  |  |  |  |  |  |
| Axial distance Lc1 (%) *1 |  |  |  |  |  | 37 |  |  |  |  |  |  |
| Length Lc2 (%) *3 |  |  |  |  |  | 32 |  |  |  |  |  |  |
| Angle γ (deg.) |  |  |  |  |  | 140-175 |  |  |  |  |  |  |
| Outer inclined sub-groove |  |  |  |  |  | Presence |  |  |  |  |  |  |
| Distance Cdi (%) *1 |  |  |  |  |  | 62 |  |  |  |  |  |  |
| Inclination direction *2 |  |  |  |  |  | +F |  |  |  |  |  |  |
| Axial distance Ld1 (%) *1 |  |  |  |  |  | 25 |  |  |  |  |  |  |
| Length Ld2 (%) *3 |  |  |  |  |  | 11 |  |  |  |  |  |  |
| Angle δ (deg.) |  |  |  |  |  | 110-130 |  |  |  |  |  |  |
| Shock absorbing performance | 5.5 | 5.5 | 5.2 | 5 | 4.5 | 4 | 5 | 3 | 5 | 5 | 5 | 5 |
| Turning performance |  |  |  |  |  |  |  |  |  |  |  |  |
| At beginning in turning | 3.5 | 4.5 | 4.7 | 5 | 4.7 | 3.5 | 5 | 5 | 3 | 5 | 5 | 5 |
| From middle period to full banked state | 5 | 5 | 5 | 5 | 5 | 4 | 4 | 3.5 | 3 | 3.5 | 4 | 4 |
| Transient characteristic | 3.5 | 4.5 | 4.7 | 5 | 4.7 | 3.5 | 4 | 3.5 | 3 | 3.5 | 4 | 4 |
| Grip performance | 3.5 | 4.7 | 5 | 5 | 5 | 5 | 5 | 5 | 3 | 5 | 5 | 4.5 |

|  | Ref. 6 | Ref. 7 | Ex. 8 | Ex. 9 | Ref. 8 | Ref. 9 | Ex. 10 | Ex. 11 | Ref. 10 | Ref. 11 | Ref. 12 |
|---|---|---|---|---|---|---|---|---|---|---|---|
| Inner inclined groove |  |  |  |  | Presence |  |  |  |  |  |  |
| Distance Cai (%) *1 |  |  |  |  | 3 |  |  |  |  |  |  |
| Inclination direction *2 |  |  |  |  | −F |  |  |  |  |  |  |
| Angle α (deg.) |  |  |  |  | 0-15 |  |  |  |  |  |  |
| Axial distance La1 (%) *1 |  |  |  |  | 38 |  |  |  |  |  |  |
| Length La2 (%) *3 |  |  |  |  | 81 |  |  |  |  |  |  |
| Arrangement of first and second inner inclined groove |  |  |  |  | Alternate (FIG. 2) |  |  |  |  |  |  |
| Outer inclined groove |  |  |  |  | Presence |  |  |  |  |  |  |
| Distance Cbi (%) *1 | 25 | 45 | 25 | 25 | 25 | 25 | 25 | 25 | 25 | 25 | 25 |
| Axial distance Cbo (%) *1 | 98 | 88 | 88 | 88 | 88 | 88 | 88 | 88 | 88 | 88 | 88 |
| Inclination direction *2 | +F | +F | +F | +F | +F | +F | +F | +F | +F | +F | −F |
| Angle βi at inner end (deg.) | 155 | 155 | 150 | 170 | 140 | 180 | 155 | 155 | 155 | 155 | 25 |
| Angle βo at outer end (deg.) | 125 | 125 | 125 | 125 | 125 | 125 | 110 | 130 | 100 | 140 | 55 |
| Axial distance Lb1 (%) *1 | 73 | 43 | 63 | 63 | 63 | 63 | 63 | 63 | 63 | 63 | 63 |

TABLE 1-continued

| | | | | | | | | | | | |
|---|---|---|---|---|---|---|---|---|---|---|---|
| Length Lb2 (%) *3 | 44 | 26 | 38 | 38 | 38 | 38 | 38 | 38 | 38 | 38 | 38 |
| Arrangement of first and second outer inclined groove | | | | | | Alternate (FIG. 2) | | | | | |
| Middle inclined groove | | | | | | Presence | | | | | |
| Distance Cci (%) *1 | 37 | 37 | 37 | 37 | 37 | 37 | 37 | 37 | 37 | 37 | 37 |
| Inclination direction *2 | +F | +F | +F | +F | +F | +F | +F | +F | +F | +F | −F |
| Axial distance Lc1 (%) *1 | | | | | | 37 | | | | | |
| Length Lc2 (%) *3 | | | | | | 32 | | | | | |
| Angle γ (deg.) | | | | | | 140-175 | | | | | 5-40 |
| Outer inclined sub-groove | | | | | | Presence | | | | | |
| Distance Cdi (%) *1 | | | | | | 62 | | | | | |
| Inclination direction *2 | +F | +F | +F | +F | +F | +F | +F | +F | +F | +F | −F |
| Axial distance Ld1 (%) *1 | | | | | | 25 | | | | | |
| Length Ld2 (%) *3 | | | | | | 11 | | | | | |
| Angle δ (deg.) | | | | | | 110-130 | | | | | 50-70 |
| Shock absorbing performance | 5 | 5 | 5 | 5 | 5 | 5 | 5 | 5 | 5 | 5 | 5 |
| Turning performance | | | | | | | | | | | |
| At beginning in turning | 5 | 3.5 | 4.5 | 4.5 | 4 | 4 | 5 | 5 | 5 | 5 | 4.5 |
| From middle period to full banked state | 3.5 | 3 | 4.5 | 4.5 | 4 | 3.5 | 4.5 | 4.5 | 3.5 | 3.5 | 3 |
| Transient characteristic | 3.5 | 3 | 4.5 | 4.5 | 4 | 3.5 | 4.5 | 4.5 | 3.5 | 3.5 | 3 |
| Grip performance | 4.5 | 5 | 5 | 5 | 5 | 5 | 5 | 5 | 5 | 5 | 5 |

| | Ex. 12 | Ex. 13 | Ex. 14 | Ex. 15 | Ex. 16 | Ex. 17 | Ex. 18 | Ex. 19 | Ex. 20 |
|---|---|---|---|---|---|---|---|---|---|
| Inner inclined groove | | | | | Presence | | | | |
| Distance Cai (%) *1 | | | | | 3 | | | | |
| Inclination direction *2 | | | | | −F | | | | |
| Angle α (deg.) | | | | | 0-15 | | | | |
| Axial distance La1 (%) *1 | | | | | 38 | | | | |
| Length La2 (%) *3 | | | | | 81 | | | | |
| Arrangement of first and second inner inclined groove | | | | | Alternate (FIG. 2) | | | | |
| Outer inclined groove | | | | | Presence | | | | |
| Distance Cbi (%) *1 | | | | | 25 | | | | |
| Axial distance Cbo (%) *1 | | | | | 88 | | | | |
| Inclination direction *2 | | | | | +F | | | | |
| Angle βi at inner end (deg.) | | | | | 155 | | | | |
| Angle βo at outer end (deg.) | | | | | 125 | | | | |
| Axial distance Lb1 (%) *1 | | | | | 63 | | | | |
| Length Lb2 (%) *3 | | | | | 38 | | | | |
| Arrangement of first and second outer inclined groove | | | | | Alternate (FIG. 2) | | | | |
| Middle inclined groove | | | | | Presence | | | | Absence |
| Distance Cci (%) *1 | 20 | 50 | 37 | 37 | 37 | 37 | 37 | 37 | — |
| Inclination direction *2 | | | | | +F | | | | — |
| Axial distance Lc1 (%) *1 | 37 | 37 | 20 | 50 | 37 | 37 | 37 | 37 | — |
| Length Lc2 (%) *3 | 32 | 32 | 17 | 43 | 32 | 32 | 32 | 32 | — |
| Angle γ (deg.) | | | | | 140-175 | | | | — |
| Outer inclined sub-groove | | | | | Presence | | | | Absence |
| Distance Cdi (%) *1 | 62 | 62 | 62 | 62 | 50 | 80 | 62 | 60 | — |
| Inclination direction *2 | | | | | +F | | | | — |
| Axial distance Ld1 (%) *1 | 25 | 25 | 25 | 25 | 25 | 20 | 10 | 40 | — |
| Length Ld2 (%) *3 | 11 | 11 | 11 | 11 | 11 | 8.8 | 4.4 | 17 | — |
| Angle δ (deg.) | | | | | 110-130 | | | | — |
| Shock absorbing performance | 5 | 5 | 5 | 5 | 5 | 5 | 5 | 5 | 5 |
| Turning performance | | | | | | | | | |
| At beginning in turning | 4.7 | 5 | 5 | 5 | 5 | 5 | 5 | 5 | 5 |
| From middle period to full banked state | 5 | 4.7 | 4.2 | 4.2 | 4.2 | 4.2 | 4 | 4.2 | 3 |
| Transient characteristic | 4.7 | 4.7 | 4.2 | 4.2 | 4.2 | 4.2 | 4 | 4.2 | 3 |
| Grip performance | 5 | 5 | 5 | 5 | 5 | 5 | 5 | 5 | 5 |

From the test results, it was confirmed that Example tires in accordance with the present invention can be effectively improved the turning performance without deteriorating other performance such as shock absorbing and grip performances.

The invention claimed is:

1. A motorcycle tire comprising
a tread portion having a designated rolling direction, the tread portion having a tread surface between a pair of tread edges while curving in a convex arc-like manner and having a tread width which is an axial distance between the tread edges being a maximum tire width, and the tread portion including a first region between a tire equator and one of said tread edges and a second region between the tire equator and the other one of said tread edge,
the tread surface being provided with a plurality of inner inclined grooves and a plurality of outer inclined grooves, each of the inner inclined grooves being arranged without communicating with each of the outer inclined grooves,
said inner inclined grooves comprising a plurality of first inner inclined grooves provided in the first region and a plurality of second inner inclined grooves provided in the second region, said first inner inclined grooves and said second inner inclined grooves being alternately arranged in a circumferential direction of the tire, in each first and second regions, said each inner inclined groove extending from an axially inner end Ai toward an anti-designated rolling direction to an axially outer end Ao at an angle α in a range of from 0 to 20 degrees with respect to the circumferential direction of the tire and having an axial length La1 between the axially inner end Ai and the axially outer end Ao in a range of from 20% to 50% of a half tread developed-width, wherein the axially inner end Ai located in an axial distance of from 0 to 5% of the half tread developed-width from the tire equator, said outer inclined grooves comprising a plurality of first outer inclined grooves provided in the first region and a plurality of second outer inclined grooves provided in the second region, said first outer inclined grooves and said second outer inclined grooves being alternately arranged in the circumferential direction of the tire, in each first and second regions, each outer inclined groove extending from an axially inner end Bi toward the designated rolling direction to an axially outer end Bo, the axially inner end Bi located axially inward of the axially outer end of the inner inclined groove, and the axially outer end Bo located in a distance of from 80 to 95% the half tread developed-width from the tire equator, each outer inclined groove having an angle βi at the axially inner end Bi of from 150 to 170 degrees with respect to the circumferential direction of the tire, and each outer inclined groove having an angle βo at the axially outer end Bo of from 110 to 130 degrees with respect to the circumferential direction of the tire, wherein, in the first region or the second region, each axially inner end of the inner inclined groove is partially overlapped with the axially inner end of one of the outer inclined, grooves in the circumferential direction of the tire, and the axially outer end of the inner inclined groove is separated from the axially outer end of one of the outer inclined grooves by a distance less than 5 mm in the circumferential direction of the tire.

2. The tire according to claim 1, wherein a plurality of middle inclined grooves are provided in the first region and the second region, in each first and second regions, said each middle inclined groove extends from an axially inner end Ci to an axially outer end Co having the same inclination direction with the outer inclined groove, the axially inner end Ci is located in between the axially inner end Bi of the outer inclined groove and the axially outer end Ao of the inner inclined groove, and the axially outer end Co is located in between the axially outer end Ao of the inner inclined groove and the axially outer end Bo of the outer inclined groove.

3. The tire according to claim 2, wherein a plurality of outer inclined sub-grooves are provided in the first region and the second region, in each first and second regions, said each outer inclined sub-groove extends from an axially inner end Di to an axially outer end Do having the same inclination direction with the outer inclined groove, the axially inner end Di is located in between the axially outer end Ao of the inner inclined groove and the axially outer end Co of the middle inclined groove, and the axially outer end Do is located axially outside the axially outer end Co of the middle inclined groove.

4. The tire according to claim 3, wherein the axially outer end Do is located axially inside the tread edge.

5. The tire according to claim 1, wherein each of the inner inclined grooves has a circumferential length La2 between the axially inner end Ai and the axially outer end Ao in a range of from 70% to 85% of a circumferential pitch Pa of the inner inclined grooves.

6. The tire according to claim 1, wherein each of the outer inclined grooves has an axial length Lb1 from the axially inner end Bi to the axially outer end Bo larger than the axial length La1 of the inner inclined grooves.

7. The tire according to claim 1, wherein the circumferential length of the overlapped portion is not more than 40 mm.

* * * * *